United States Patent [19]

Joosten

[11] 4,245,836
[45] Jan. 20, 1981

[54] APPARATUS FOR POSITIONING SHEET LIKE ORIGINALS

[75] Inventor: Joannes J. W. M. Joosten, Baarlo, Netherlands

[73] Assignee: Oce-van der Grinten N.V., Venlo, Netherlands

[21] Appl. No.: 22,323

[22] Filed: Mar. 20, 1979

[30] Foreign Application Priority Data

Mar. 23, 1978 [NL] Netherlands .................... 7803129

[51] Int. Cl.³ .............................................. B65H 9/20
[52] U.S. Cl. .................................. 271/228; 271/236; 271/252; 271/261; 355/14 SH; 355/97
[58] Field of Search ............... 271/227, 228, 236, 237, 271/238, 239, 240, 250, 252, 261; 355/3 SH, 14 SH, 68, 75, 97

[56] References Cited

U.S. PATENT DOCUMENTS

| | | | |
|---|---|---|---|
| 1,951,901 | 3/1934 | Cottrell | 271/228 |
| 4,058,359 | 11/1977 | Urselmann | 355/95 X |

*Primary Examiner*—Bruce H. Stoner, Jr.
*Attorney, Agent, or Firm*—Albert C. Johnston

[57] ABSTRACT

An apparatus for positioning a sheet-like original on the feed table of a copying machine comprises a plurality of sensors, mounted on the table, that have different states of response corresponding to the presence or absence of an original at the sensor on the table. The sensors are mounted in pairs, the sensors in each pair being arranged symmetrically with respect to the center line of the feed table that extends parallel to the direction of feed of sheet-like originals. A lateral transport mechanism causes an original, lying ready to be copied, to be displaced in a lateral direction, transverse to the feed direction. A control circuit inactivates the lateral transport mechanism when one of two conditions occurs, namely, when both sensors of each pair of sensors simultaneously have the same state or when, in any one pair of sensors, one sensor has been enabled in the response state corresponding to the presence of an original and subsequently been disabled in the non-response state corresponding to the absence of the original and the other sensor of the pair has thereafter been enabled in the response state corresponding to presence of the original.

4 Claims, 9 Drawing Figures

APPARATUS FOR POSITIONING SHEET LIKE ORIGINALS

The present invention relates to an apparatus for positioning a sheet-like original on the feed table of a copying machine that is adapted to reproduce an image on image receiving material and is provided with at least two receiving materials having different widths and further includes means for transporting an original, lying ready to be copied, past an exposure station. The apparatus of the invention comprises a number of sensors that are mounted on the feed table of the machine and that react to the presence or absence of an original.

BACKGROUND OF THE INVENTION

Sheet-positioning apparatus for use with contact copying machines in which an original is exposed in contact with an image receiving material are generally known. In some such machines, at least two image receiving materials having different widths are positioned in such a way that the longitudinal edges of rolls or piles of the materials lie in a plane that also contains a longitudinal guide on the feed table for positioning originals thereon. However, such an arrangement of the receiving materials is not desirable in copying machines of the indirect copying type in which an image of the original is transferred by a lens and a photoconductive medium to the receiving material since, when relatively small originals are not situated centrally with respect to the lens, they are reproduced by a portion of the lens that has inferior optical quality. Moreover, the image of such relatively small originals would be formed near an edge portion of the photoconductive medium so that irregular wearing of this medium over its width would occur. Also, the various functional stations of the machine, such as image developing and transfer stations would be asymmetrically electrostatically charged.

The object of the invention is to provide a copying machine of the indirect copying type that minimizes the disadvantages previously encountered.

SUMMARY OF THE INVENTION

In accordance with the invention, at least two sensors are arranged as a pair and are mounted on the feed table of a copying machine in positions corresponding to the edges of a receiving material. Each of the sensors is enabled in a response state corresponding to the presence of an original and disabled in a non-response state corresponding to the absence of an original. Means are provided for laterally transporting an original, lying ready to be copied, over the feed table in a direction transverse to the feed direction of the original. A control circuit inactivates the means for laterally transporting the original when one of two conditions occurs, namely when both sensors of each pair of sensors have the same state or when, in any one pair of sensors one sensor has been enabled in the response state and subsequently is disabled in the non-response state corresponding to the presence and later absence of an original and thereafter the other sensor of the pair has been enabled in the response state corresponding to the presence of an original.

Other characteristics and advantages of the invention will become clear from the following description, in which reference is made to the accompanying drawings.

DESCRIPTION OF THE PREFERRED EMBODIMENTS

Figure 1:
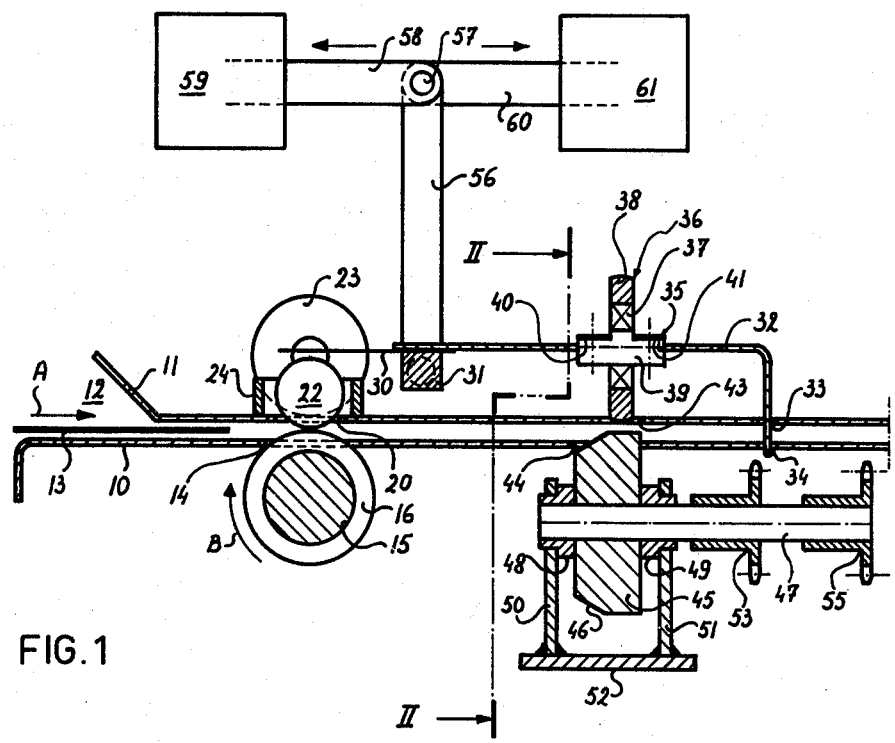
FIG. 1 is a diagrammatic illustration, partly in vertical cross-section, of an apparatus of the invention for feeding an original through a copying machine.

FIG. 1 diagrammatically represents the apparatus for feeding an original through a copying machine which may be of the type as described in more detail in U.S. Pat. No. 4,058,359.

The feed apparatus includes a lower guide 10 and an upper guide 11, the ends of which are shown at the left of FIG. 1 and that together form a feed slot 12 into which a sheet-like original 13 can be manually introduced in the direction of arrow A.

A number of rectangular openings 14 formed in the lower guide are aligned in the direction perpendicular to the direction of feed of the original. A shaft 15, mounted below the openings 14, is freely rotatably journalled in bearings mounted in sideplates (not shown) of the apparatus and is driven continuously in the direction of the arrow B by a rotary prime mover (not shown). A number of rings 16 are firmly connected to the shaft 15 for rotation therewith, with each ring in registry with one opening 14. Each ring 16 has an outer diameter of sufficient size so that a circumferential portion thereof extends through the associated opening 14 into the channel formed between guides 10 and 11.

A first set of openings 20 and a second set of openings (not shown) are formed in the upper guide 11 in such a way that each of these openings lies opposite to an opening 14. In the illustrated embodiment, as seen in the direction of the shaft 15, openings 14 alternately lie opposite an opening of either set. The openings 20 are circular and the openings of the second set are rectangular.

A ball 22, for instance a marble, is rotatably positioned in each circular opening 20 and has an outer diameter that is slightly larger than the diameter of the opening 20, so that a portion of the outer spherical surface of each ball 22 rests on the circumferential portion of one ring 16. In the embodiment shown, each ball 22 is kept in its associated opening 20 by gravity. A cylindrical wall 24 is mounted on the upper guide 11 in concentric relation about each opening 20 and about each ball 22 in order to prevent the ball from jumping from the opening as a result of vibrations or shocks imparted thereto. If desired, each cylindrical wall 24 may be provided with a retaining portion at its upper end having an inner diameter slightly smaller than the outer diameter of the associated ball 22 through which the ball 22 can nevertheless be pressed. In this way, balls 22 can be prevented from falling out of openings 20 when the copying machine is tilted to an inclined position, for instance during the shipping.

A roll 23 is mounted above guide 11 in registry with each opening 21. A mechanism, described below in detail, is provided to shift the roll 23 between three positions, namely a first position (shown in FIG. 1) with a tangent to the circumference of the roll generally coinciding with the upper guide 11, a second position with the circumference of the roll situated completely above the guide 11, and a third position with a portion of the circumference of the roll extending through the associated opening 21 and pressing against a circumferential portion of the opposite ring 16.

Each roll 23 is fixed to a shaft that is fixed against a resilient plate 30 by means of screws. The plate 30 is provided with a number of rectangular recesses at one longitudinal edge for accommodating the rolls 23 with each rectangular recess lying opposite and corresponding to an opening 21. The other longitudinal edge of the plate 30 is fixed to a rod 31 that is freely rotatably mounted between the frameplates (not shown) of the apparatus. The relative rotational position of rod 31 determines which of the positions of the rolls 23 is assumed.

A first relatively long leg of an L-shaped profile 32 is also fixed to the rod 31 and the other relatively short leg of the profile is adapted to project downwardly through openings 33 and 34 respectively formed in the upper and lower guides 11 and 10 when in both the first rotational position (shown in FIG. 1) and a second rotational position of rod 31. In its first and second positions the shorter leg of profile 32 constitutes an arrest or stop for originals fed through the channel between upper and lower guides 11 and 10. In the third rotational position of the rod 31 and, hence, of rolls 23, the profile 32 lies fully outside the space between the guides 10 and 11.

As shown in FIG. 1, the horizontally extending, long leg of the profile 32 is formed with a number of rectangular openings 35, which are aligned in the direction perpendicular to the direction of feed of the original 13 through the apparatus. A small roll 36 is mounted to project through each opening 35 and has an axis that extends generally parallel to the direction of feed of the original 13. Each small roll 36 comprises a ball bearing 37 having an outer race provided with an antislip covering in the form of a rubber ring 38. Each ball bearing 37 is fixed to a shaft 39 having two free ends each formed with a flattened upper surface 40 and 41, respectively. Each shaft 39 is fixed by means of screws to the legs of a U-shaped resilient plate 42 (FIG. 2) in such a way that the associated roll 36 is accommodated between the legs of the plate. The body of each U-shaped plate 42 is fixed by means of screws to the profile 32. A number of rectangular openings 43 are formed in the upper guide 11, through each of which may project one small roll.

There is an opening 44 in the lower guide 10 opposite each opening 43 in the upper guide 11. A portion of a roll 45 extends through each opening 44 and has an outer circumference lying midway between the guides 10 and 11. Each roll 45 is disposed exactly opposite to a small roll 36. Each roll 45 has a bevelled portion 46 that is inclined outwardly from minimum to maximum diameter in the direction of feed of originals 13 through the apparatus. The axes of the roll 45 are parallel to the axes of the small roll 36. Each roll 45 is fixed to a shaft 47 which via two bearing bushes 48 and 49 is rotatably supported in bearings in two plates 50 and 51 that are mounted on a base 52 which is fixed between the frame plates of the apparatus.

A first sprocket 53 is fixed to each shaft 47 and a chain (not shown) engages all of the sprockets 53 and a toothed drive wheel (not shown). A second sprocket 55 is also mounted on each shaft 47 and is coupled by a chain (not shown) with a driven sprocket mounted for rotation on the shaft of a step motor (not shown).

Since the small rolls 36 are mounted on the profile 32, they can also be placed in three different positions corresponding to the three positions of the rod 31 and the rolls 23. In particular, in first and third positions, the small rolls 36 lie out of the channel formed between the guides 10 and 11 and in a second position the small rolls 36 extend through openings 43 and press against the circumferences of associated rolls 45.

The mechanism for positioning the rolls 23, the profile 32 and consequently the small rolls 36 in any one of the three positions described above rotates the rod 31 which is firmly connected to one end of an arm 56. This mechanism then, includes the arm 56, the other end of which is firmly connected by a hinge pin 57 to the armature 58, which extends horizontally, of a first solenoid 59 and with the armature 60, which also extends horizontally, of a second solenoid 61. When both the first and second solenoids 59 and 60 are deenergized, the arm 56 will be in an intermediate position that corresponds to the first position of the small rolls 23 and the profile 32 (FIG. 1). Springs (not shown) may be provided to ensure that this first position is assumed when the solenoids are deenergized. When the solenoid 61 is energized, the arm 56 will pivot toward the right, as seen in FIG. 1, about the axis of the rod 31 so that the rolls 23 and the profile 32 arrive in the second position. When the solenoid 59 is energized, the arm 56 will pivot toward the left, as seen in FIG. 1, about the axis of the rod 31 so that the rolls 23 and profile 32 arrive in the third position. The solenoids should never be energized simultaneously.

In copying machines in which copies can be made on one of a number of receiving materials having different widths, the receiving material on which a copy is made being dependent on the dimensions of the original and also on the reproduction ratio of the optical system of the copying machine, the optimal position of the original on the feed table of the machine is that in which the receiving material having minimum width required for full reproduction of the image on the original is used. In practice, this will mean that the longitudinal edges of the original should fully lie within certain limits.

In the light of the requirement noted above, the original should lie centrally on the feed table when the receiving material is positioned in the copying machine with its center line coinciding with the center line of the photoconductive medium.

As soon as the leading edge of the original lies against the arrest formed by the shorter leg of the profile 32, it will be stopped if the original is optimally positioned in accordance with the factors mentioned above. The optimal position of an original on the feed table can be visually determined by the machine operator. For this purpose, a number of markings may be applied to the lower guide 10 that are, for instance, arranged in pairs, marks in each pair being symmetrical with regard to the center longitudinal line of the feed mechanism. In this manual mode of operation, the operator positions the original fully within one pair of markings that correspond to the smallest dimension of the receiving material which is still larger than the width of the original. In order to bring the original in this position, it is manually displaced crosswise or laterally with regard to the direction of feed of the original. This displacement can also be done semi-automatically by energizing the solenoid 61 and by driving the rolls 45 in the appropriate direction. For this purpose, a set of control knobs may be provided near the place of operation that control energization of the solenoid 61, the start and stop of the driving of the rolls 45 and the direction of rotation of the rolls 45. The disadvantage of this semi-automatic mode of operation is that the operator still must visually determine when the original has arrived in the optimal lateral position and stop the driving of the rolls 45 in time so that the original stops in the optimal position.

As soon as the original occupies the optimal lateral position, the original can be transported further through the copying machine by deenergizing solenoid 61 and by energizing solenoid 59. This operation causes the rolls 23 to be pressed against the rings 16 so that the original can no longer slip over the rings 16. Simultaneously, the profile 32 is raised lifting the shorter leg thereof from between the guides 10 and 11 so that the original can be transported further through the copying machine.

According to the invention, a system, described below in detail, is now provided with which the original can be automatically brought to the optimal lateral position on the feed table before it is fed further through the copying machine.

Figure 3:
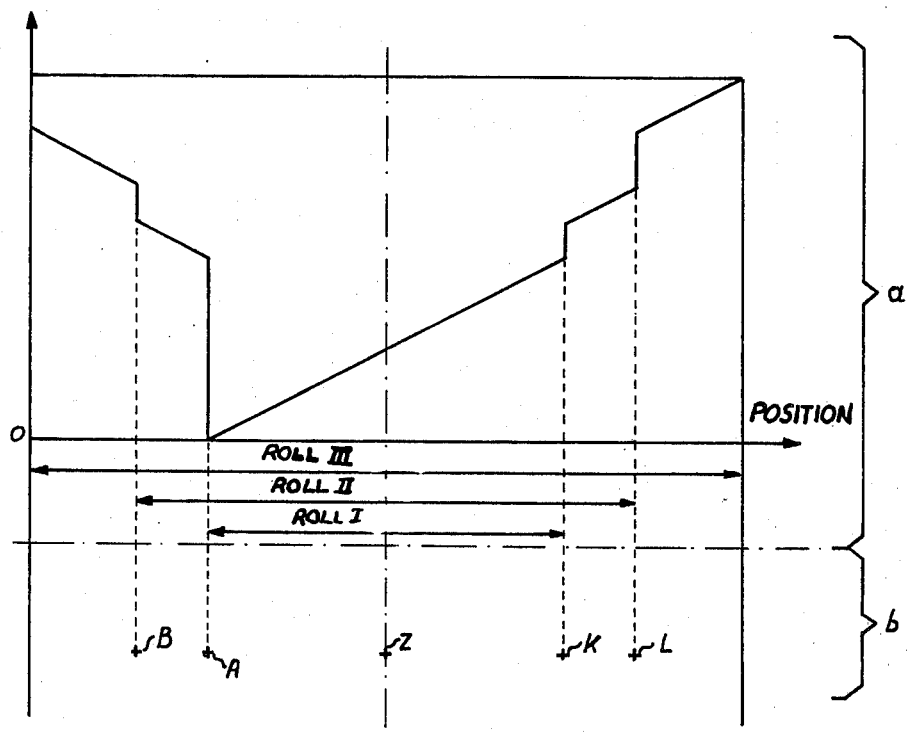
FIG. 3 is a top plan view of a feed table according to the invention, with a diagram which represents the optimal position on the table for originals having various dimensions.

The feed table of a copying machine of the invention is diagrammatically shown in top plan view in FIG. 3. A row of sensors B, A, K and L which are enabled in a response state corresponding to the presence of an original at the sensor, and are disabled in a non-response state corresponding to the absence of an original at the sensor, is mounted on the feed table.

In the example of this preferred embodiment of the invention, the copying machine is provided with three rolls of receiving material, each having a different width, as diagrammatically shown in FIG. 3. In accordance with the invention, sensors A and K are situated symmetrically with regard to the center line of the feed table and the distance between them is equal to the width of roll I. The sensors B and L are also situated symmetrically with regard to the center line and the distance between them is equal to the width of roll II. Finally, the width of the roll III corresponds to the width of the feed table.

FIG. 3 at a graphically illustrates how, according to the invention, originals of different widths are positioned automatically on the feed table. The width dimensions of the originals are plotted on the vertical axis. Therefore, it is possible to read off on the horizontal axis where the original lies. It is assumed that the original is introduced along an edge guide which coincides with the left side edge of the feed table (the vertical axis).

Figure 4:
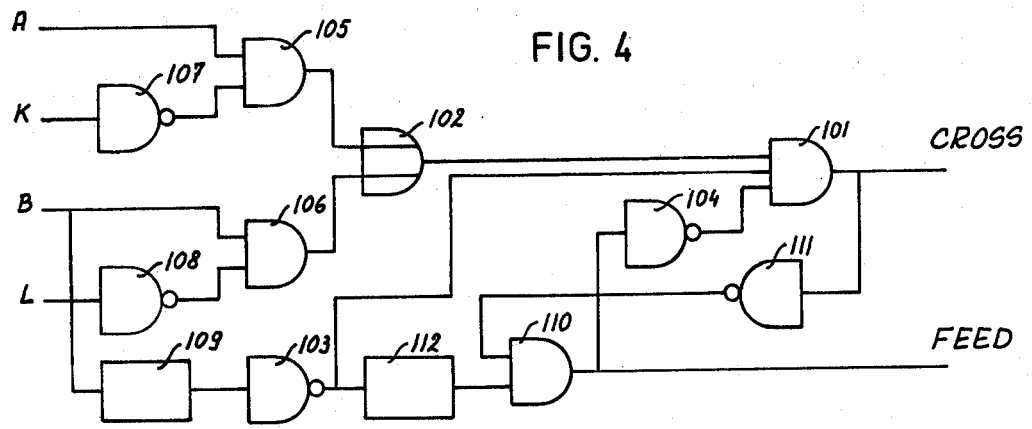
FIG. 4 is an electrical schematic diagram of a circuit for controlling operation of the feed apparatus shown in FIGS. 1 through 3.

In FIG. 4 an electrical control circuit is shown that controls positioning of the original according to the invention, using sensors A, B, K, and L. For purposes of explanation, the output of each sensor is "zero" when the sensor is not covered by the original and is "one" when the sensor is covered by the original.

The electrical circuit shown in FIG. 4 has four inputs that are connected to the respective sensors A, K, B and L and two outputs, indicated as "CROSS" and "FEED" respectively. The output "CROSS" is connected to the circuit for energizing solenoid 61 in such a way that the solenoid 61 is energized and is deenergized respectively, when the "CROSS" output signal is one and zero respectively. In the same way, the "FEED" output is connected to a circuit for energizing solenoid 59 in such a way that the solenoid 59 is energized and is deenergized, respectively, when the "FEED" output is one and zero respectively.

The "CROSS" output signal originates from an AND-gate 101 having three inputs that are connected respectively to the output of an OR-gate 102, an inverter 103 and an inverter 104. The OR-gate 102 has two inputs which are respectively connected to AND-gates 105 and 106. The two inputs of the AND-gate 105 are respectively connected to the output of the sensor A and through an inverter 107 with the output of the sensor K. The two inputs of the AND-gate 106 are respectively connected to the output of the sensor B and through an inverter 108 to the output of the sensor L.

The inverter 103 is connected through a monostable multivibrator 109 to the output of the sensor B. The monostable multivibrator 109 is of the type which reacts to an input signal going from zero to one and in response thereto generates a pulse, having value of one and a pulse width of about two (2) seconds.

The input to the inverter 104 is connected to the output of an AND-gate 110 which determines the "FEED" output signal. The two inputs to the AND-gate 110 are respectively connected through an inverter 111 to the output of the AND-gate 101 and through a pulse delay unit 112 to the output of inverter 103. The pulse delay unit 112 delays further transmission of the pulse received from multivibrator 109 by about ten (10) ms.

The operation of the electrical circuit shown in FIG. 4 for controlling the apparatus, shown in FIGS. 1 and 2, to feed originals of different widths will now be explained. For example, this circuit and apparatus will feed and laterally position on the feed table an original having a width smaller than the distance between the sensors A and K, an original having a width larger than the distance between the sensors A and K but smaller than the distance between the sensors B and L, an original having a width larger than the distance between the sensors B and L but smaller than the distance between the longitudinal guide (the vertical axis) and the sensor L, and an original with a width larger than the distance between the longitudinal guide and the sensor L.

For purposes of explaining the operation of the apparatus of the invention, it is assumed that the rolls of receiving material are of DIN-sizes. Therefore, the width of the feed table is equal to 60 cm, the distance between the sensors B and L is equal to 42 cm and the distance between the sensors A and K is equal to 30 cm.

Further, it is assumed that longitudinal feed rolls 15 and 16 rotate with a circumferential speed of ten (10) cm/sec and that the cross or lateral transport rolls 45 have a circumferential speed of five (5) cm/sec. The sensors A, B, K and L are mounted about five (5) cm from the arrest defined by the profile 32, so that an original will encounter them prior to engaging the arrest.

Figure 5:
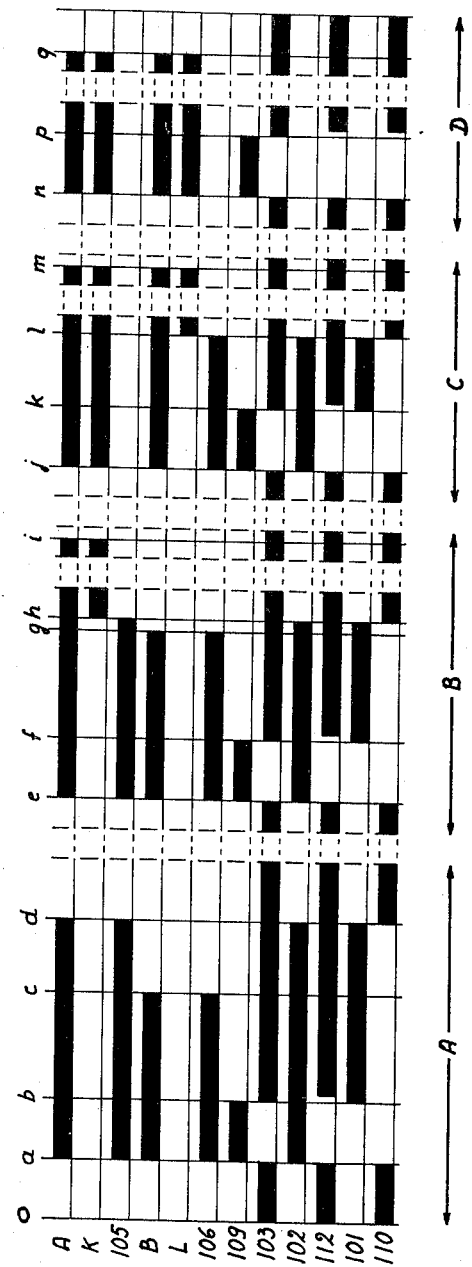
FIGS. 5A through 5D are signal-time diagrams indicating the condition or state of the components of the circuit shown in FIG. 4 as a function of time while originals having various dimensions are fed by the feed apparatus.

FIG. 5 is a signal-time diagram indicating the conditions or states of the components of the circuit shown in FIG. 4 as a function of time which an original is fed through the apparatus of the invention. More particularly, FIG. 5A is such a diagram for feed of an original with a width of 25 cm; FIG. 5B for feed of an original with a width of 35 cm; FIG. 5C for feed of an original with a width of 45 cm and FIG. 5D for feed of an original with a width of 55 cm. The components of the circuit are indicated along the vertical axis and the horizontal axis represents time. A component enabled state or state of one is indicated by a black bar.

When the copying machine and original feeding apparatus are switched on with no original in the feeding apparatus, the components of the control circuit generate signals having the values indicated at time "o", the leftmost vertical line in FIG. 5A. The "FEED" signal is one thereby energizing the solenoid 59. When an original having a width of 25 cm is introduced into the feeding apparatus with one longitudinal edge abutting the longitudinal guide mounted on the left side of the feed table, the leading edge of the original will then cause sensors A and B to be excited as indicated at time "a" in FIG. 5A. Therefore, at time "a" the output signal of the AND-gate 105 and the output signal of the AND-gate 106 become one, and consequently, the output signal of the OR-gate 102 becomes one. As a further consequence of excitation of the sensor B, the output of the monostable multivibrator becomes one during two (2) seconds so that during the same time the output of the inverter 103 is zero. Therefore, both the "CROSS" signal and the "FEED" signal become zero. Energization of the solenoid 59 ends and the arrest or shorter leg of profile 32 moves to the position shown in FIG. 1. The original moves forward until its leading edge abuts and lies parallel to the arrest.

After two seconds, the output of the monostable multivibrator 109 becomes zero at time "b". Therefore, the output of inverter 103 becomes one and, since both the output of the OR-gate 102 and the inverter 104 are one, the output of the AND-gate 101 becomes one so that the solenoid 61 is energized and the cross or lateral displacement of the original starts. Ten ms later the output of the delay unit 112 also becomes one but this causes no further effect in the circuit since the AND-gate 110 is disabled, having output of zero, by the output signal of AND-gate 101 conducted through inverter 111.

The original is now transported to the right, as seen in FIG. 3. At time "c" the excitation of sensor B ends when it is uncovered by the original. However, there is no further effect on the circuit. At time "d" the original ceases to cause sensor A to be excited. Since the outputs of the AND-gates 105 and 106 have now become zero, the outputs of OR-gate 102 and AND-gate 101 also become zero, so that the solenoid 61 is deenergized and cross transport of the original stops. At the same time "d", the AND-gate 110 is enabled, its output becoming one, so that solenoid 59 is energized and the original is longitudinally fed further through the feed apparatus.

In the operation mentioned above, when an original is not on the feed table, the solenoid 59 is permanently excited. As soon as an original is introduced onto the feed table and covers sensor B, energization of solenoid 59 stops so that the position of the rod 31 and the parts of the apparatus mounted on it as shown in FIG. 1 is assumed. Therefore, the original can position itself with its leading edge against the arrest 32. Therefore, sensors A, B, K and L are best situated to the left of the rolls 23 and 15-16 seen in FIG. 1. It is also assumed for purposes of explanation that drive means for an original, mounted to the right of the arrest formed by profile 32 as seen in FIG. 1, are switched on and off with the solenoid 59.

When an original with a width of 35 cm is introduced into the feeding mechanism, the sensors A and B are again excited at a time "e" as shown in FIG. 5B. The outputs of the AND-gates 105 and 106 therefore become one, the output of the monostable multivibrator 109 temporarily becomes one, and the outputs of the elements 103, 112 and 110 at least temporarily become zero. During the time that the output of the monostable multivibrator 109 is one, the original is not laterally transported. As soon as the output of the monostable multivibrator 109 becomes zero, at time "f", the output of the inverter 103 becomes one so that the output of the AND-gate 101 also becomes one and the cross transport of the original starts.

As the output of the AND-gate 101 becomes one, the AND-gate 110 is disabled, its output becoming zero, so that further feed of the original longitudinally through the apparatus cannot take place. During the cross transport, the original first ceases to excite the sensor B at time "g" so that the output of the AND-gate 106 becomes zero. However, no other change in the circuit occurs at this time. A moment later, at time "h", the sensor K is excited by the original so that the output of the AND-gate 105 becomes zero, and consequently, the output of the AND-gate 101 becomes zero. The cross transport of the original stops and the AND-gate 110 is enabled, its signal becoming one. Therefore, longitudinal feed of the original starts. Longitudinal feed of the original will cause the sensors A and K to be simultaneously uncovered and cease to be excited at time "i". The apparatus is then returned to the same condition as that existing prior to introduction of the original therein. A second original can then be fed into the apparatus.

FIG. 5C is a signal-time diagram of the conditions of the circuit components as a function of time during feed by the apparatus of an original having a width of 45 cm. At time "j", the sensors A, B, and K are covered by the original and therefore are excited. At time "k" logic is performed by the circuit so that cross transport of the original starts. At time "l" the sensor L is covered by the original and excited so that cross transport of the original stops and the further feed of the original through the apparatus starts. Finally at time "m", the sensors A, B, K and L are uncovered and cease to be excited so that the apparatus is ready for receiving a new original.

A special case occurs when introducing an original with a width larger than the distance between the left longitudinal guide and the sensor L. Such an original may, for example, have a width of 55 cm. At time "n", the sensors A, B, K and L are covered by the original and therefore excited simultaneously so that the output of the OR-gate 102 remains zero and consequently no cross transport of the orignal takes place. After the output of the monostable multivibrator 109 has again become one at time "p", further longitudinal feed of the original through feed apparatus starts after a short delay time, caused by the delay 112. At time "q", the sensors A, B, K and L are again uncovered and become unexcited. Therefore, the apparatus is ready for receiving a new original.

In another embodiment of the invention, which can be explained with reference to FIGS. 6, 7 and 8, the original can be introduced in any arbitrary lateral position and nevertheless be automatically positioned in the lateral direction so that the optimal lateral position is approached as closely as possible.

In this embodiment, a sensor Z is mounted in the center of the feed table (FIG. 6) at the same longitudinal position as the sensors A, B, K and L. The sensor Z is used in laterally positioning narrow originals having width smaller than the distance between sensors A and K. Moreover, it must be possible to displace the original laterally both to the left and to the right. For that purpose, the cross transport mechanism is not only provided with a start/stop control, but also with a coupling with which one of the two directions of rotation for the cross transport rolls 45 can be selected.

The position that the original will ultimately occupy is determined by whether or not a cross displacement is necessary and by the direction of the cross displacement. After cross displacement of an original toward the right, the original will be positioned according to the diagram FIG. 6a. After a cross displacement toward the left, the original will be positioned according to the diagram FIG. 6b. When no cross displacement has taken place, the original will be positioned in accordance with the diagram FIG. 6c.

Figure 2:
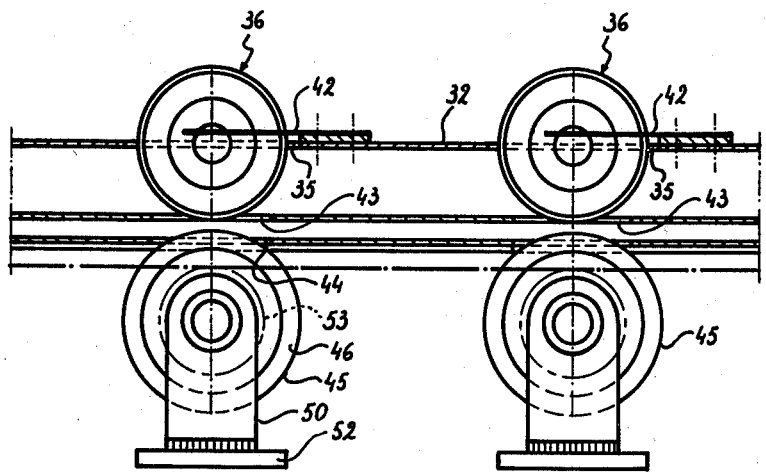
FIG. 2 is a vertical cross-sectional view of the feed apparatus taken through plane II–II in FIG. 1.
Figure 7:
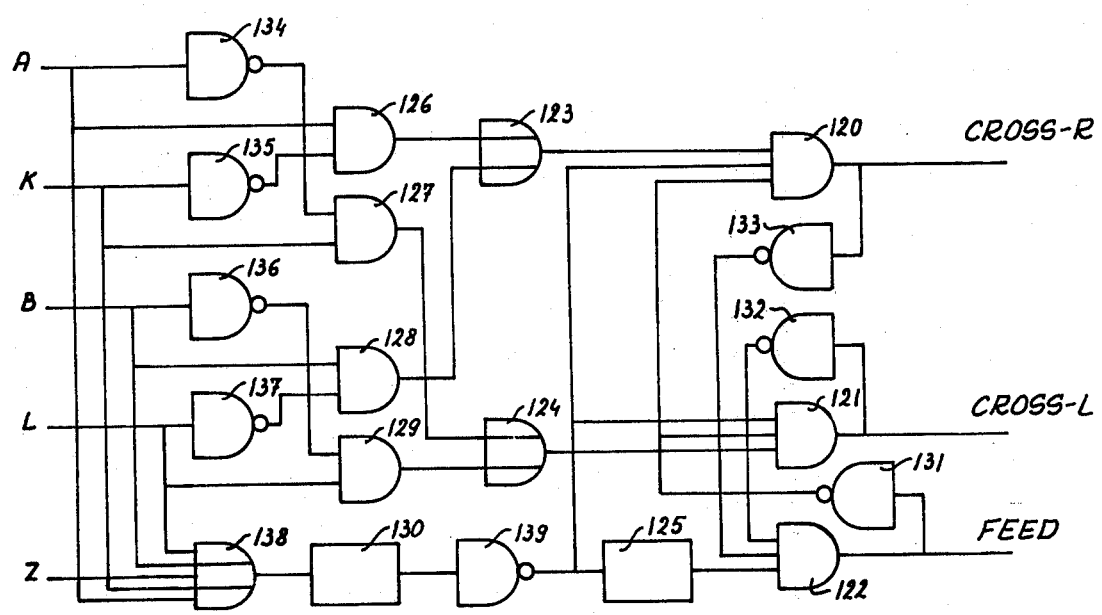
FIG. 7 is an electrical schematic diagram of a second embodiment of the circuit for controlling the feed apparatus.
Figure 6:
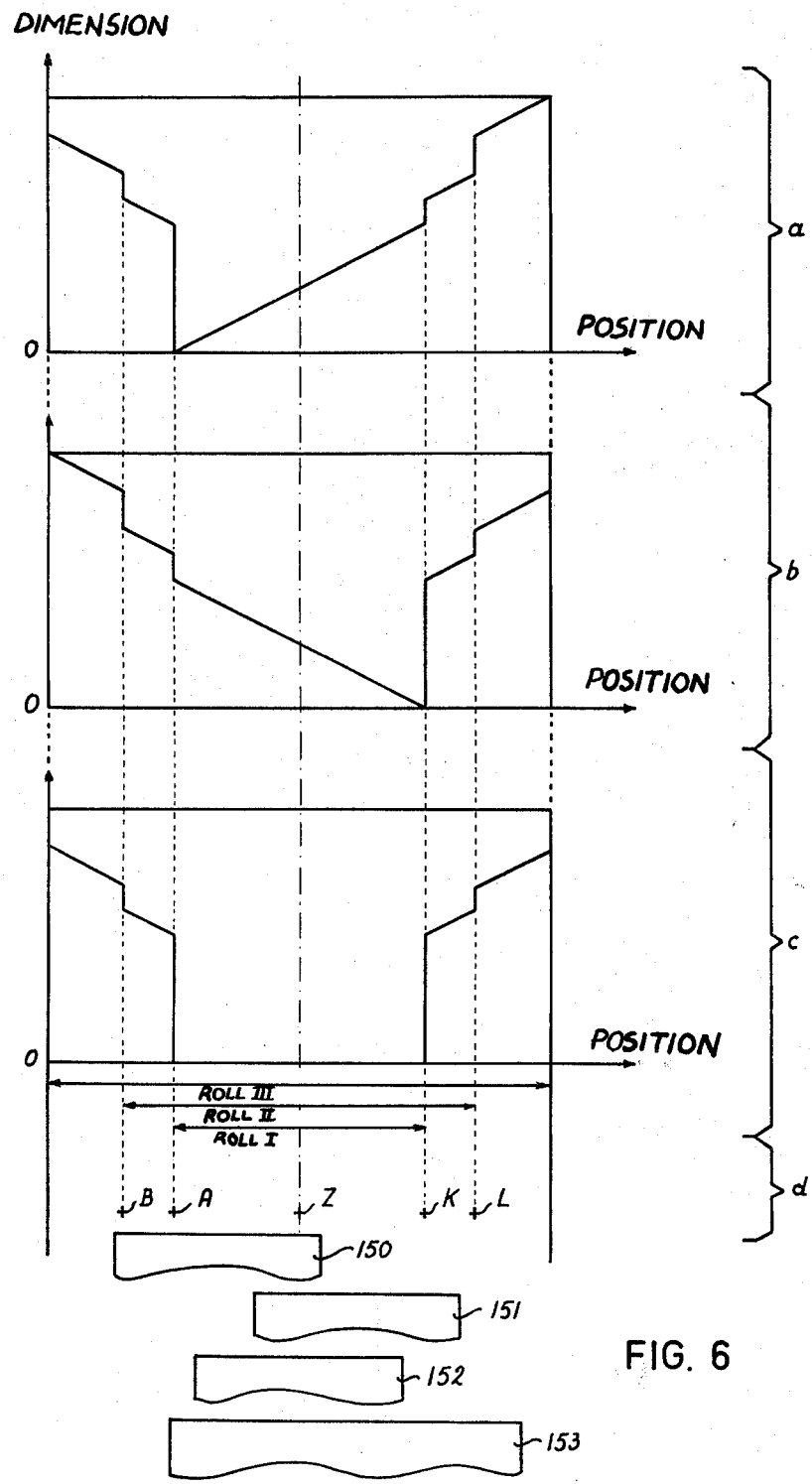
FIG. 6 is a top plan view of a feed table according to the invention, with a diagram which represents arbitrary positions for originals having various dimensions fed to the feed table.
Figure 8:
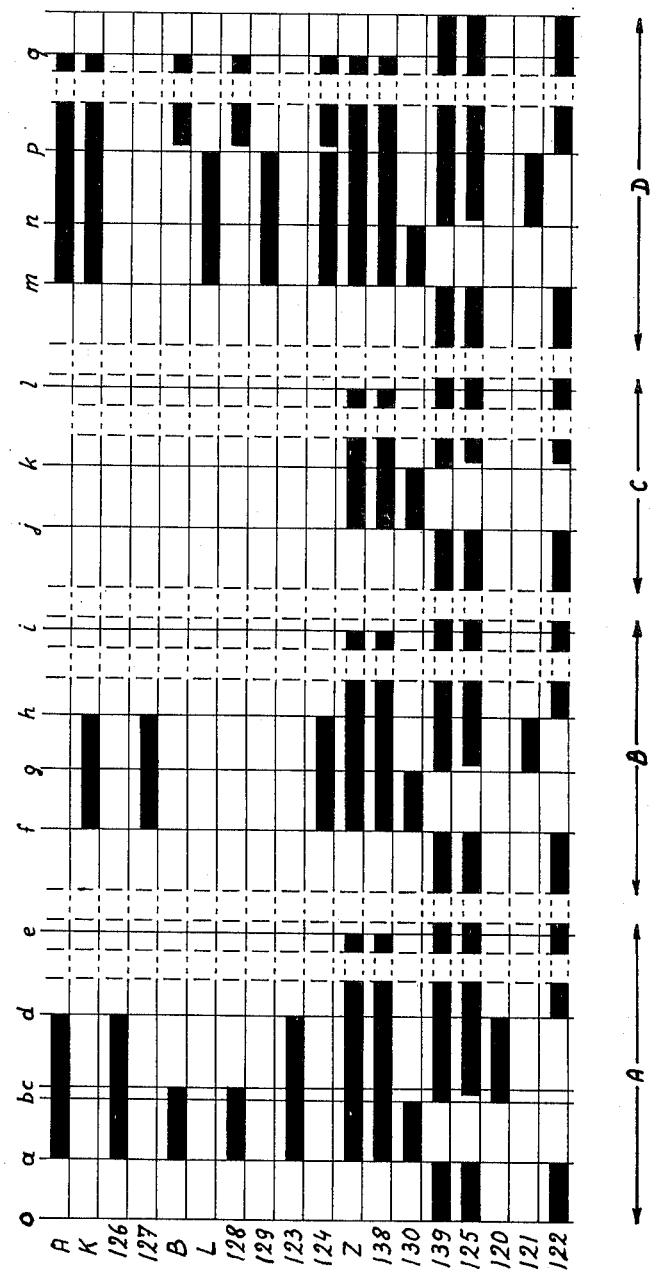
FIGS. 8A through 8D are signal-time diagrams indicating the condition or state of the components of the circuit shown in FIG. 7 as a function of time while originals having various dimensions are fed by the feed apparatus.

FIG. 7 is a schematic diagram for an electrical circuit used to control the feeding apparatus shown in FIGS. 1 and 2 for positioning an original as graphically illustrated in FIG. 6. In this circuit, there are five inputs which are from the respective sensors A, K, B, L and Z and three outputs "CROSS-R", "CROSS-L" and "FEED". The outputs "CROSS-R" and "CROSS-L" are connected to the energizing circuit for solenoid 61 and to the coupling of the cross transport mechanism that controls the direction in which rolls 45 are rotated (not shown). When the "CROSS-R" output is one the solenoid 61 is energized and the coupling of the cross transport mechanism is engaged to cause transport of an original toward the right. When "CROSS-R" signal is zero, the solenoid 61 is deenergized and the coupling is inactive. When the "CROSS-L" signal is one the solenoid 61 is energized and the coupling of the cross transport mechanism is engaged to cause transport of an original toward the left. When the signal "CROSS-L" is zero, the solenoid 61 is deenergized and the coupling is inactive. The "FEED" output signal is conducted to the circuit for energizing the solenoid 59 to energize or deenergize it respectively, when the output signal "FEED" is one and zero respectively.

The "CROSS-R" output signal originates from an AND-gate 120 having three inputs, which are respectively connected with the outputs of an OR-gate 123, an inverter 139, and an inverter 131. The OR-gate 123 has two inputs which are connected respectively with AND-gates 126 and 128. The AND-gate 126 has two inputs that are connected respectively to the output of the sensor A and through inverter 135 to the output of the sensor K. The two inputs of the AND-gate 128 are respectively connected to the output of the sensor B and through an inverter 137 to the output of the sensor L.

The inverter 139 is connected through a monostable multivibrator 130 to the output of an OR-gate 138 with five inputs that are respectively connected with the outputs of the sensors A, K, B, L and Z. The monostable multivibrator 130 is of the type which reacts when the input signal thereto goes from zero to one and then generates a pulse having a value of one with a pulse width of about two (2) seconds. The inverter 131 is connected to the output of an AND-gate 122 from which the "FEED" output signal originates.

The "CROSS-L" output signal originates from an AND-gate 121 with three inputs that are respectively connected with the outputs of an OR-gate 124, the inverter 139 and the inverter 131. The OR-gate 124 has two inputs that are respectively connected with AND-gates 127 and 129. The AND-gate 127 has two inputs that are connected respectively to the output of the sensor K and through an inverter 134 with the output of the sensor A. The AND-gate 129 has two inputs that are connected respectively to the output of the sensor L and through an inverter 136 with the output of the sensor B.

The three inputs to the AND-gate 122 are respectively connected through an inverter 133 to the output of the AND-gate 120, through an inverter 132 to the output of the AND-gate 121 and through a pulse delay unit 125 with the output of the inverter 139. The pulse delay unit 125 gives a time delay of about ten (10) ms to the output from inverter 139.

The operation of the electrical circuit shown in FIG. 7 for controlling the feed apparatus to position originals having various widths and introduced into the apparatus in different lateral positions will now be explained with reference to FIG. 6. The originals 150, 151 and 152 shown in FIG. 6 have a width of 25 cm and the original 153 has a width of 42 cm. The distances between the respective sensors A, B, K and L and the centerline sensor Z and the speeds of rotation of feed rolls 15 and 16 and lateral cross transport rolls 45 are the same as those specified with reference to FIG. 3. FIG. 8 represents a signal-time diagram showing the output states of the various components of the circuit shown in FIG. 7 as a function of time during feed of the originals 150, 151, 152 and 153 through the feed apparatus. In particular, FIG. 8A is such a diagram for feed of original 150; FIG. 8B for feed of original 151; FIG. 8C for feed of original 152; and FIG. 8D for feed of original 153.

When the feed apparatus is switched on and when no original is present in the apparatus at time "o", output signals of the circuit components are as indicated at the leftmost side of FIG. 8A.

When the original 150 is introduced into the feed apparatus, its leading edge will cover and therefore excite sensors A, B and Z at time "a" (FIG. 8A). In this way, the output signals of the AND-gates 126 and 128 and consequently of OR-gate 123 become one. Moreover, the output of the OR-gate 138 becomes one, the output of the monostable multivibrator 130 temporarily becomes one, and the outputs of inverter 139 and of the AND-gates 120, 121 and 122 remain zero. Therefore, the "FEED" signal becomes zero and feed of the original is stopped.

After two seconds, at time "b", the output of the monostable multivibrator 130 becomes zero (FIG. 8A). Thus, the output of the inverter 139 becomes one, the three inputs to AND-gate 120 also become one, and the "CROSS-R" signal becomes one causing cross transport of the original 150 toward the right. Ten ms later the output of the delay unit 125 becomes one. However, no further change in the circuit takes place at this time since AND-gate 122 is maintained at zero output by inverter 133.

During cross transport of original 150 toward the right as seen in FIG. 6, sensor B is uncovered and disabled at time "c" but no further change takes place in the circuit at this time. At time "d" (FIG. 8A) the sensor A is uncovered and disabled. Therefore, both inputs to OR-gate 123 become zero, its output becomes zero, so that the output of the AND-gate 120 also becomes zero. Cross transport of original 150 toward the right then stops. At the same time, the output of AND-gate 122 becomes one and longitudinal feed of the original 150 starts. Feed of the original 150 continues until time "e" when the rear edge thereof uncovers and disables sensor Z. The feed apparatus is then ready to receive another original.

When an original 151 is fed into the apparatus, sensors K and Z are covered and therefore excited at time "f" (FIG. 8B) by the leading edge thereof. After the pulse time of two (2) seconds of the monostable multivibrator has passed at time "g" (FIG. 8B), the output of AND-gate 121 becomes one whereby cross transport of the original 151 starts toward the left as seen in FIG. 6. At time "h" (FIG. 8B), sensor K is uncovered and disabled, thereby stopping cross transport and starting longitudinal feed of the original 151. At time "i", sensor Z is uncovered and disabled. The apparatus is then ready to receive another original.

The function of the sensor Z may be explained with reference to feed of the original 152. When this original is introduced into the feed apparatus, the leading edge only covers and excites sensor Z. Consequently, cross transport of the original does not occur and longitudinal feed is temporarily stopped because the monostable multivibrator 130 output becomes one, inverter 139 output becomes zero and AND-gate 122 output becomes zero, all at time "j" (FIG. 8C). After two (2) seconds at time "k" (FIG. 8C), the output of the monostable multivibrator 130 again becomes zero and, since no cross transport of the original is necessary, further longitudinal feed of the original starts 10 ms later. At time "l", the sensor Z is uncovered and disabled and the apparatus is ready to receive another original. In absence of the sensor Z the original 152 would have been fed through the apparatus without interruption, so that the lateral position of the original could not have been corrected if necessary.

Another special case occurs when the original has a width almost the same as the distance between two sensors. Ordinarily, the time at which a sensor is excited will determine when the outputs of the respective components shown in FIG. 7 will become one. It is possible in this case for one sensor of a pair to be uncovered nearly simultaneously with but a short time prior to the covering of the other sensor of the pair. Therefore, both sensors of each pair will not have the same state of reaction or response to the presence of an original. In the circuit and apparatus of the second embodiment, the simplest solution to this problem is to delay the output signal from a sensor when the output changes from zero to one indicating that the sensor has been covered and enabled but not to delay such output when it changes from one to zero indicating that the sensor is uncovered and disabled. Since the output of the sensor being covered is delayed relative to that of the sensor being uncovered, the circuit shown in FIG. 7 reacts as if both sensors are simultaneously uncovered and cross transport is stopped. In the most unfavorable case, the original will be positioned after being laterally transported in one direction and then the other. It will then be possible for the longitudinal feed of the original to start.

Figure 7A:
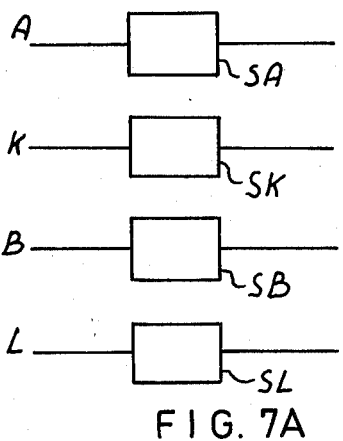
FIG. 7A is a diagram of signal delaying devices for the circuit of FIG. 7.

One way to implement this principle in practice is to conduct the output signals of each of the sensors A, B, K and L through a Schmitt-trigger, as shown at SA, SK, SB, and SL, respectively, in FIG. 7A. A Schmitt-trigger characteristically delays an enabling signal such as that going from zero to one and does not delay or delays for a shorter time a disabling signal such as that going from one to zero.

In FIG. 8D, a signal-time diagram is provided for feed of the original 153 which has a width equal to the distance between the sensors B and L, using the sensor signal delay scheme described above. When the original 153 is fed longitudinally into the apparatus, the sensors A, K, L and Z are covered and excited at time "m". Subsequently after two (2) seconds, at time "n", cross transport of the original toward the left starts. At time "p", sensor B is covered and excited and sensor L is uncovered and disabled. Since it is more quickly signaled through a Schmitt-trigger that the output of sensor L has become zero, than it is signaled that the output of sensor B has become one, the output of OR-gate 124 becomes zero for a short time so that the output of AND-gate 121 also becomes zero and the output of AND-gate 122 one. The AND-gates 120 and 121 also then have zero output, so that further cross transport of the original is prevented.

The original is further fed longitudinally in the apparatus in such a way so that at time "q" (FIG. 8D) the sensors A, K, B and Z are uncovered and disabled and the apparatus is ready to again receive another original.

It will be appreciated that the circuit and apparatus of the first embodiment described with reference to FIGS. 3 and 4 operate to stop lateral transport of an original in the special cases described above, that is when the original is equal or nearly equal to the distance between a pair of sensors. However, Schmitt-triggers need not be used to delay transmission of a sensor enabling signal relative to the transmission of a sensor disabling signal. Instead, the circuit of FIG. 4 is arranged so that if only that sensor of any one pair of sensors having the greatest distance from the longitudinal edge guide is excited and both sensors of each other pair of sensors simultaneously have the same state of response to presence of an original then lateral transport of the original stops. That is if either sensor K or L is excited and its companion sensor A or B respectively is not excited, and both sensors of the other pair of sensors simultaneously have the same state of excitement, then lateral transport of the original stops. For example, an original having width of nearly 30 cm will first be longitudinally fed by the apparatus so that sensors A and B are covered and enabled. Lateral transport will occur until sensors B and A are uncovered, sensor L remaining uncovered, with only sensor K being covered. In this case both AND-gates 105 and 106 have an output of zero so that OR-gate 102 has output of zero and AND-gate 101 has output of zero. Therefore, lateral transport of the original stops.

More generally, in both embodiments the control circuits described in detail above inactivate the lateral transport mechanism when one of two conditions occurs, namely when both sensors in each pair of sensors simultaneously have the same state or when, in any one pair of sensors, one sensor has been enabled in a response state and subsequently has been disabled in a non-response state corresponding respectively to presence and subsequent absence of an original and the other sensor of the pair has thereafter been enabled in the response state corresponding to the presence of the original.

What is claimed is:

1. In an apparatus for positioning a sheet-like original on the feed table of a copying machine that is provided with at least two image receiving materials having different widths and includes means for feeding said original in a feed direction past an exposure station to be copied onto one of said receiving materials, the improvement comprising:

a plurality of sensors mounted on said feed table, each of which is enabled in a response state corresponding to the presence of an original at the sensor, and is disabled in a non-response state corresponding to the absence of an original at the sensor, said plurality comprising at least one pair of sensors which are spaced apart by a distance corresponding to the width of one of said receiving materials;

means for transporting in a direction transverse to said feed direction an original lying ready to be copied; and means for inactivating said transporting means when one of the followng first and second respective conditions occurs:
A. both sensors of each pair of sensors simultaneously have the same state; or
B. in any one pair of sensors one sensor has been enabled in the response state corresponding to the presence of an original and subsequently been disabled in the non-response state corresponding to the absence of the original and the other sensor of the pair has thereafter been enabled in the response state corresponding to the presence of an original.

2. Apparatus according to claim 1 further comprising a longitudinal guide along which an original may be guided in said feed direction, said transporting means being operable to move an original relative to said longitudinal guide and wherein in the second of said conditions said one sensor is that of said any one pair having the smallest distance from said longitudinal guide and said other sensor is that of the pair having the greatest distance from said longitudinal guide.

3. Apparatus according to claim 1 or 2, each said sensor generating an enabling signal when in the response state and a disabling signal when in the non-response state, further comprising means for delaying transmission of an enabling signal after generation thereof by a sensor for a period longer than that between generation and transmission of a disabling signal by the sensor.

4. Apparatus according to claim 3, said delaying means comprising a Schmitt-trigger.

* * * * *